Nov. 29, 1949     E. H. TRAUB     2,489,835
OPTICAL PROJECTION SYSTEM HAVING APERTURED
CONCAVE IMAGE FORMING MIRROR
Filed Nov. 14, 1945
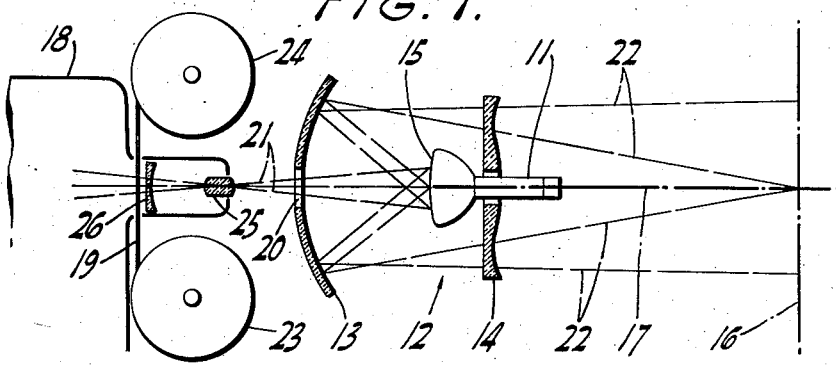
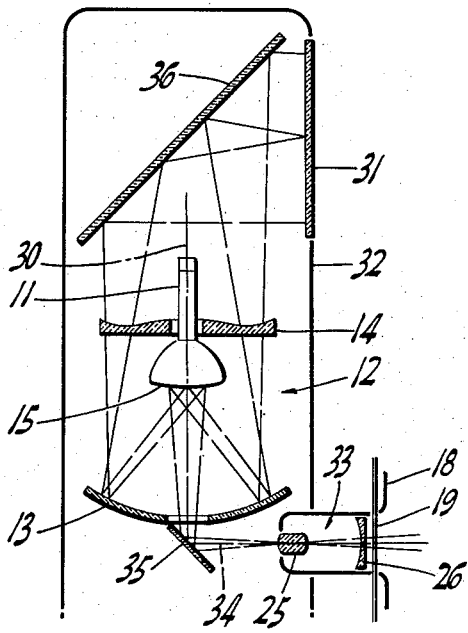
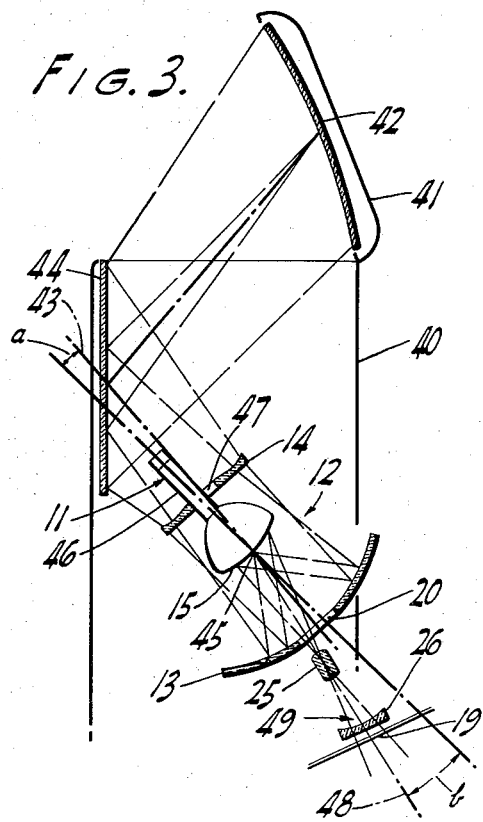
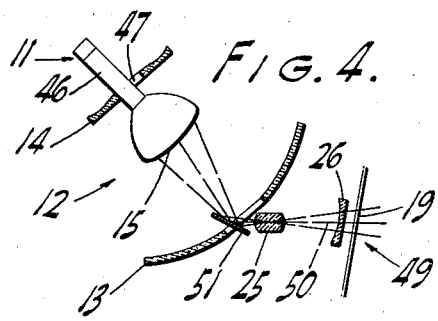
INVENTOR.
ERNEST H. TRAUB
BY HIS AGENT
Carl H. Synnestvedt Patented Nov. 29, 1949

2,489,835

UNITED STATES PATENT OFFICE 2,489,835

OPTICAL PROJECTION SYSTEM HAVING APERTURED CONCAVE IMAGE FORMING MIRROR

Ernest H. Traub, Philadelphia, Pa., assignor, by mesne assignments, to Philco Corporation, Philadelphia, Pa., a corporation of Pennsylvania Application November 14, 1945, Serial No. 628,426

2 Claims. (Cl. 88—24)

This invention has to do with projection-type optical systems, and has particular reference to the projection of images, either still or in motion, into position for viewing.

While of broader applicability, the invention is particularly useful in connection with television receivers of the type utilizing the catadioptric Schmidt optical system. The Schmidt optical system is well known in optics, and a detailed discussion of its application to the television art is unnecessary to a clear understanding of the present invention. However, if desired, a description of such an application may be had by reference to Patent No. 2,273,801 issued February 17, 1942, to Daniel O. Landis.

An important object of the present invention is to provide improved apparatus for projecting images, either still or in motion, into position for viewing.

Another object of the invention is the provision of simplified image projection apparatus which makes use of the optical system of a television receiver, as a component thereof.

A further object is the provision of such projection apparatus which, while using the television optical system, does not disturb nor necessitate adjustments of said system.

A still further and more specific object of the invention is to provide such projection apparatus which utilizes the Schmidt type catadioptric optical system.

Still another object of the invention is to provide an image projection apparatus of the aforesaid character, which is characterized by its simplicity and ease of operation.

In general, the invention contemplates the provision of image projection apparatus employing novel principles as clearly set forth in the following specification and illustrated in the attached drawings, in which:

Figure 1 is a diagrammatic showing of the invention in its fundamental aspect;

Figure 2 is a diagrammatic view of a television receiver incorporating the present invention;

Figure 3 is a diagrammatic view, similar to Figure 2, illustrating a modified form of the invention, and Figure 4 is a fragmentary illustration of a modified portion of the apparatus.

In practicing the invention, there is used a projector, of either the motion picture or slide type, with a specially adapted optical system effective sharply to focus images on the fluorescent screen of the cathode-ray tube, by projection through the aperture provided in the spherical reflector or mirror. This fluorescent material, comprising the mosaic screen of the tube, serves as a diffuse radiator for the intermediate optical image projected thereon, the television projection optical system then functioning in the usual manner to project the image onto the viewing screen of the receiver.

More particularly and in the simpler form, illustrated in Figure 1, the invention includes television apparatus of the type referred to heretofore, which, in addition to the usual tube 11, includes an optical system, designated generally by the numeral 12, which is preferably of the Schmidt catadioptric type and comprises a spherical reflector or mirror 13 and a correcting plate or refractor lens 14, positioned substantially at the center of curvature of said reflector. This type of optical system is adapted to project an image from the screen 15 of tube 11 into sharp focus upon a screen or wall, indicated by numeral 16, for viewing purposes. In addition to the elements described above, all of which are aligned along a common optical axis as indicated at 17, the invention includes a primary image projector 18, which, as illustrated, is of the motion picture type, but which may, if preferred, be of the slide or other still projection types. The body of the projector is positioned to the left (as viewed in Figure 1) or behind the reflector 13, while the axis of the optical system thereof coincides with the axis 17 of the television optical system so that the primary images on film 19 projected through the opening 30 in mirror 13 (as indicated diagrammatically by the lines 21) will appear upon screen 15 of cathode ray tube 11.

The tube screen may be composed of any suitable substance adapted to radiate light but is preferably composed of translucent fluorescent material which acts as a diffuse radiator of the light rays forming the intermediate image thereon. The diffused rays of this intermediate image incident upon the surface of mirror 13 are reflected through correcting plate 14, to correct for spherical aberration originating at the mirror, and into sharp focus upon viewing screen 16, as indicated at 22.

It is to be noted that film 19 is fed through the motion picture projector in a manner to reproduce the intermediate picture images upon the tube screen in an inverted position, from which position they will pass through the optical system of the television receiver to appear upon the viewing screen in their normal upright position. To this end it has been found expedient merely to reverse the directional flow of the film by running it from the bottom reel 23 to the top reel 24 of the projector. It should be understood that for the sake of clarity, and because they form no part of the present invention, the usual film-threading and pull down mechanisms of the projector have been omitted from the drawings.

It will be further understood that the screen of the tube preferably, though not necessarily, has a radius of curvature equal to approximately .53 of the radius of spherical reflector 13. Additionally, while not absolutely necessary for successful operation of the invention, it is considered preferable to provide some means for curving the image received by the tube screen, so that a sharp intermediate image may be produced upon the fluorescent screen of the tube.

Curving of the image may be accomplished by using a projecting objective lens which is overcorrected for field flatness, or a normally corrected projection objective lens 25 may be used with a field curver which may be in the form of a strong negative lens 26 placed close to the primary image 19. Either of these methods will produce sharp intermediate image focus over the tube face, but for the purpose of illustration the latter system has been shown in the drawing.

While Figure 1 illustrates the invention in a simpler form, it is self-evident that the projection apparatus would interfere with satisfactory viewing of the image appearing upon screen 16, if the screen be of the reflective type, particularly when the focal length is short. Therefore, in practice, it is preferred to use forms of the invention similar to those illustrated in Figures 2, 3 or 4, wherein the viewing screen and primary image projector are so arranged that the viewed image is not vignetted, or masked, by the components of the optical systems.

In Figure 2, for example, the television receiver and its optical system are arranged along a vertical axis designated by the numeral 30, in accordance with known practice, while the viewing screen 31 is located in a vertical position on the face of cabinet 32.

This form of the invention provides more convenient viewing the projected image and enables otherwise advantageous location of the primary image projector, but is attended by difficulties which make necessary certain modifications in the arrangement of some of the components of the system embodying the invention. For example, the height of the screen from the floor is best determined by the eye level of an average person seated in position to view the screen. This distance or height is normally insufficient to permit the projector to be placed in a position wherein the optical axis thereof would be coincident with the vertical optical axis of the television optical system. Therefore, as illustrated in Figure 2, and in accordance with the present invention, the projector 18 is positioned in front of, or two one side of the cabinet, with its optical system 33 arranged to project light from the primary images along a substantially horizontal axis 34 and upon a reflective element or mirror 35 positioned angularly at approximately 45° with respect to the horizontal axis 34 of projector optical system 33 and the vertical axis 30 of television optical system 12. From this angularly placed mirror light rays are reflected into sharp image forming focus upon fluorescent screen 13 of tube 11, from which they pass through the television optical system in the manner heretofore described in connection with Figure 1, to another and larger plane mirror 36 also positioned at an angle of approximately 45° with respect to the vertical portion 30 of the optical axis, so that rays incident upon said mirror are reflected to and focussed upon the vertical translucent viewing screen 31.

Figure 3 illustrates another type of television cabinet arrangement, wherein the viewing screen is positioned at an angle oblique to the axis of the optical system.

The invention as illustrated in this figure includes a cabinet 40 provided with a lid or cover 41 in which there is positioned a viewing screen 42. While for the purposes of this invention it will be understood that the screen might be flat, it is preferred to employ a curved screen, as shown, which is preferably of the type disclosed and claimed in my copending application, Serial No. 651,064, filed March 1, 1946, now abandoned. Since the present invention is not concerned with the construction of the screen, per se, a detailed description thereof is considered unnecessary to a clear understanding of the invention and has, therefore, been omitted.

Positioned within the cabinet, and having its optical axis 43 at an angle oblique to the vertical, there is positioned a television optical system 12 of a type substantially as shown and described heretofore in connection with Figures 1 and 2, but with certain modifications hereinafter described.

The optical system so functions that light rays from images formed or projected upon the fluorescent screen of tube 11 are reflected upon a mirror 44 which, in turn, reflects them into focus upon viewing screen 42.

Because of the oblique angle of screen 42 with respect to axis 43 of the optical system, images will appear upon the screen, as of distorted shape, if correction is not made.

This distortion may be eliminated or corrected by distorting reversely the image upon the fluorescent screen of the tube. For example, let it be assumed that the image being projected is substantially rectangular, but as appearing on screen 42, is of keystone form with a long top line and a short bottom line, then by reversely distorting the image upon the tube screen proportionately, the aforesaid long and short lines may be made of equal length with a resultant rectangular image appearing upon the viewing screen.

In the present invention, therefore, to produce a sharply focused, substantially rectangular image upon viewing screen 42, it is provided that the primary image be projected upon tube screen 15 in a manner predistorting it sufficiently to compensate for the distortion which would otherwise appear upon screen 42.

Correcting for this condition in the present instance is accomplished by rotating tube 11 counter-clockwise with the center 45 of tube screen 15 as the center of rotation. As the neck 46 of the tube extends through an opening 47 in the center of correction plate 14 the amount of angular displacement or rotation of the tube is limited, in the present example to the angle indicated by the letter $a$, or approximately 5°. While in some instances this amount of rotation may be sufficient to correct the image distortion, in the embodiment illustrated in Figure 3, this angle is insufficient to correct for the normal distortion caused by the particular angle at which screen 42 is arranged with respect to axis 43 and, therefore, the optical axis 48 of projector 18 has been counter-rotated in a clockwise direction about the center 45 of screen 15, to increase the total correcting angle to an angle substantially equal to that shown at b, or approximately three times the value of angle a.

This rotation of optical axis 48 is limited by the diameter of aperture 20 in mirror 13 and while the rotation of both tube 11 and projector lens system 48 may be sufficient to correct for the keystone distortion, a slight out of focus condition may still be present, in which case correction may be had by positioning field curver 26 and rectangular primary image 19 at an oblique angle to the axis of the projection optical system, as indicated at 49.

Thus it is evident, that in the form of the invention illustrated in Figure 3, a predistorted or keystone-shaped intermediate image of the primary image 19 is projected upon tube screen 15 from which it passes through the optical system 12 to appear on screen 42 in an enlarged corrected and substantially rectangular form.

As explained heretofore, the height of the screen from the floor may be insufficient to accommodate the projector optical system along the same axis as the television receiver components of the system, and, therefore, it is contemplated that the form of the invention illustrated in Figure 3 may be additionally modified as illustrated in Figure 4, wherein the rays from the primary image are projected along a substantially horizontal axis 50 upon a plane mirror 51. This mirror is positioned in a manner to reflect these rays and to form an intermediate image upon screen 15 of tube 11, substantially as described with reference to Figure 3.

In conclusion it should be understood that aside from the fluorescent screen 15 of tube 11, the television receiving components are unimportant insofar as the operation of the present invention is concerned, and that any screen having the diffuse radiating qualities of the tube screen 15 will operate as efficiently.

Having thus described the invention it is now evident that there is provided an improved apparatus of such a nature as to enable use of the high speed optical system of a projection-type television receiver, under another mode of operation, that is, in the projection and viewing of motion pictures or the like.

Further, corollary advantages are that provision of a separate screen is made unnecessary and that a moving picture projector, for example, may be readily arranged in a concealed position in whicch it does not redvce the space available in the viewing area.

I claim:

1. A reflective projection optical system including: a viewing screen; a concave image-forming mirror having a generally central aperture therein; an image-receiving screen disposed in confronting relation with respect to the concave side of said mirror, said image-receiving screen and said viewing screen each being disposed along an optical axis and each at a conjugate focus of said mirror; and image projection means disposed adjacent the opposite side of said concave mirror and including lens means in operative alignment to project images through the said aperture of said concave mirror into focus upon said image-receiving screen for projection by said concave mirror into focus upon said viewing screen.

2. A reflective projection optical system having an optical axis and including: a concave image-forming mirror having an aperture therein; an image-receiving screen positioned in confronting relation with respect to the concave side of said mirror; a viewing screen, said mirror being effective to reflect images from said image-receiving screen into focus upon said viewing screen, the surface of said viewing screen being arranged at an angle oblique to said optical axis whereby a distored image would normally appear thereon; and image projection means including an optical system in operative alignment to project images through the aperture of said mirror and into focus upon said image-receiving screen, said second-mentioned optical system having an optical system having an optical axis obliquely disposed with respect to the optical axis first-mentioned and in a direction opposite to the obliquity of said viewing screen, whereby to prevent said distortion.

ERNEST H. TRAUB.

REFERENCES CITED

The following references are of record in the file of this patent:

UNITED STATES PATENTS

| Number | Name | Date |
| --- | --- | --- |
| 1,870,702 | Zworykin | Aug. 9, 1932 |
| 2,170,979 | Straubel | Aug. 29, 1939 |
| 2,234,227 | Bellow et al. | Mar. 11, 1941 |
| 2,251,984 | Cleaver et al. | Aug. 12, 1941 |
| 2,273,801 | Landis | Feb. 17, 1942 |
| 2,295,779 | Epstein | Sept. 15, 1942 |
| 2,295,802 | Nicoll | Sept. 15, 1942 |
| 2,307,210 | Goldsmith | Jan. 5, 1943 |
| 2,316,550 | Biglake | Apr. 13, 1943 |
| 2,342,874 | Links et al. | Feb. 29, 1944 |
| Re. 22,628 | Rosenthal | Apr. 10, 1945 |

FOREIGN PATENTS

| Number | Country | Date |
| --- | --- | --- |
| 214,749 | Switzerland | Aug. 16, 1941 |

Certificate of Correction

Patent No. 2,489,835　　　　　　　　　　　　　　　　　　November 29, 1949

ERNEST H. TRAUB

It is hereby certified that errors appear in the printed specification of the above numbered patent requiring correction as follows:

Column 3, line 48, after the word "viewing" insert *of*; line 64, for "two" read *to*; column 6, lines 30 and 31, strike out "optical system having an";

and that the said Letters Patent should be read with these corrections therein that the same may conform to the record of the case in the Patent Office.

Signed and sealed this 16th day of May, A. D. 1950.

[SEAL]

THOMAS F. MURPHY,
*Assistant Commissioner of Patents.*